Patented June 6, 1933

1,912,797

UNITED STATES PATENT OFFICE

WILHELM SCHNEIDER, OF DESSAU IN ANHALT, GERMANY, ASSIGNOR TO AGFA ANSCO CORPORATION, OF BINGHAMTON, NEW YORK, A CORPORATION OF NEW YORK

PHOTOGRAPHIC MATERIAL

No Drawing. Application filed July 1, 1931, Serial No. 548,265, and in Germany July 16, 1930.

My present invention relates to photographic materials and more particularly to photographic films or plates provided with an anti-halation layer.

The use of dyes of the triphenylmethane group for the manufacture of anti-halation layers is known. These dyes have, however, the inconvenience that they are soluble only in strong alkaline developers, whilst they are insoluble or difficultly soluble in developers of less alkalinity, for instance, in developers containing borax.

According to my present invention, antihalation layers of an increased solubility in alkali are made by using as dyes compounds of the aminotriphenylmethane series and their N-substitution products which contain one or more carboxylic groups in the molecule. These dyes very quickly and completely dissolve, even in very weakly alkaline developers.

These aminotriphenylmethane carboxylic acids are obtainable by acting upon the corresponding fuchsone carboxylic acids under pressure with ammonia, methylamine, ethylamine, dimethylamine, diethylamine, aniline or other substituted or unsubstituted aliphatic or aromatic amines whereat the nuclear OH group contained in the fuchsone carboxylic acids is partially or completely exchanged by the corresponding amino radical.

These new anti-halation layers are made in the known manner; the dyes are either dispersed in a suitable binding agent, for instance, gelatin, gum arabic, glucose or the like or, preferably, applied in an alcoholic solution without using a binding agent. Besides the aminotriphenylmethane dyes mentioned above the layers may, of course, also contain other suitable dyes. Generally, the free carboxylic acids are used.

The invention is illustrated by the formulae following hereafter, showing how to prepare the dye solutions to be applied onto the photographic material:

On a photographic layer support from cellulose nitrate or cellulose acetate an antihalation layer is applied consisting of a solution of 5 grams of fuchsine-monocarboxylic acid (obtained by acting with ammonia under pressure upon aurinemonocarboxylic acid)
75 cc. of propanol
25 cc. of isobutanol or 5 grams of fuchsine-dicarboxylic acid (obtained by acting with ammonia under pressure upon aurinedicarboxylic acid)
100 cc. of isobutanol or 5 grams of fuchsine-tricarboxylic acid (obtained by acting with ammonia under pressure upon aurine-tricarboxylic acid)
100 cc. of isobutanol or 5 grams of fuchsine-monocarboxylic acid
5 grams of aurine-tricarboxylic acid
0.8 gram of shellac
100 cc. of isobutanol or 1 gram of fuchsine-tricarboxylic acid
5 grams of aurine-tricarboxylic acid
0.9 gram of shellac
50 cc. of propanol
50 cc. of isobutanol or 5 grams of aurine-tricarboxylic acid
5 grams of aniline blue tricarboxylic acid (obtained by acting with aniline upon aurine-tricarboxylic acid under pressure)
100 cc. of isopropanol or 5 grams of aniline blue dicarboxylic acid (obtained by acting with aniline upon aurine dicarboxylicacid under pressure)
100 cc. of isobutanol My present invention is not limited to the foregoing examples or to the specific details given therein. Thus, I may use, for instance, other dyes of the aminotriphenylmethane series substituted in the manner described by carboxylic acid radicals, or bearing in the amino group other radicals of the aliphatic or aromatic series. Furthermore, these dyes may be substituted in the nuclei by halogen, alkyl and equivalent substituents. Binding agents well known in the art may likewise be used in which the dyes either are dissolved or finely dispersed.

The use of carboxylic acids of the fuchsone series for the same purpose is the subject matter of my copending application Serial No. 488,990, filed October 15, 1930 and is not claimed per se in the present application.

What I claim is:—

1. Photographic materials provided with an anti-halation layer containing a dye of the aminotriphenylmethane series having at least one carboxylic group in the molecule.

2. Photographic materials provided with an anti-halation layer containing fuchsine-dicarboxylic acid.

3. Photographic materials provided with an anti-halation layer containing fuchsine-monocarboxylic acid.

4. Photographic materials provided with an anti-halation layer containing aniline-blue tricarboxylic acid.

5. Photographic materials provided with an anti-halation layer containing a fuchsine having at least one carboxylic group in the molecule.

6. Photographic materials provided with an anti-halation layer containing an N-substitution product of the amino-triphenylmethane series having at least one carboxylic group in the molecule.

In testimony whereof, I affix my signature.

WILHELM SCHNEIDER.